(12) United States Patent
Xu

(10) Patent No.: US 11,933,452 B2
(45) Date of Patent: Mar. 19, 2024

(54) CONTROL DEVICE OF LIFTING PLATFORM FOR DETECTION DEVICE AND DETECTION DEVICE

(71) Applicant: JINGDONG TECHNOLOGY INFORMATION TECHNOLOGY CO., LTD., Beijing (CN)

(72) Inventor: Zhetao Xu, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 45 days.

(21) Appl. No.: 17/757,565

(22) PCT Filed: Dec. 8, 2020

(86) PCT No.: PCT/CN2020/134565
§ 371 (c)(1),
(2) Date: Jun. 17, 2022

(87) PCT Pub. No.: WO2021/121079
PCT Pub. Date: Jun. 24, 2021

(65) Prior Publication Data
US 2023/0013418 A1    Jan. 19, 2023

(30) Foreign Application Priority Data
Dec. 18, 2019    (CN) .......................... 201911310790.2

(51) Int. Cl.
*F16M 11/28* (2006.01)
*F16M 11/04* (2006.01)
(Continued)

(52) U.S. Cl.
CPC .......... *F16M 11/28* (2013.01); *F16M 11/046* (2013.01); *F16M 11/42* (2013.01);
(Continued)

(58) Field of Classification Search
CPC ...... F16M 11/28; F16M 11/046; F16M 11/42; F16M 11/043; F16M 11/18;
(Continued)

(56) References Cited

U.S. PATENT DOCUMENTS

| 5,906,648 A | 5/1999 | Zoratti et al. |
| 2013/0075203 A1 | 3/2013 | Sayles |
| 2018/0292840 A1 | 10/2018 | Sakai |

FOREIGN PATENT DOCUMENTS

| CN | 101694312 A | 4/2010 |
| CN | 201757485 U * | 3/2011 |

(Continued)

OTHER PUBLICATIONS

International Search Report dated Mar. 17, 2021 of PCT International Application No. PCT/ CN2020/134565.
(Continued)

*Primary Examiner* — Tan Le
(74) *Attorney, Agent, or Firm* — Qinghong Xu

(57) ABSTRACT

Provided are a detection device and a control device of a lifting platform thereof, wherein the control device is used for controlling the lifting platform of the detection device, wherein the control device comprises a first distance measuring sensor arranged on the top of the detection device; a first processor connected with the first distance measuring sensor and used for obtaining a first distance measurement instruction and controlling the first distance measuring sensor to measure a first distance between the top of the detection device and an obstacle directly above the detection device according to the first distance measurement instruction; the first processor is further used for obtaining the first distance sent by the first distance measuring sensor, generating an elevation instruction according to the first distance,
(Continued)

and controlling a lifting motor of the detection device to drive the lifting platform to rise to the target position.

15 Claims, 3 Drawing Sheets

(51) Int. Cl.
  *F16M 11/42* (2006.01)
  *G05D 1/00* (2006.01)
  *G05D 1/02* (2020.01)
  *G01S 15/08* (2006.01)
  *G01S 15/88* (2006.01)
  *H04N 7/18* (2006.01)

(52) U.S. Cl.
  CPC ......... *G05D 1/0274* (2013.01); *F16M 11/043* (2013.01); *G01S 15/08* (2013.01); *G01S 15/88* (2013.01); *H04N 7/188* (2013.01)

(58) Field of Classification Search
  CPC .. G05D 1/0274; G05D 1/0255; G05D 1/0238; G01S 15/93; G01S 15/88; G01S 15/08; H04N 7/188; H04N 23/56
  See application file for complete search history.

(56) References Cited

FOREIGN PATENT DOCUMENTS

| CN | 203144040 U | * | 8/2013 |
|---|---|---|---|
| CN | 203819171 U | | 9/2014 |
| CN | 203858364 U | | 10/2014 |
| CN | 104634328 A | | 5/2015 |
| CN | 104803133 A | * | 7/2015 |
| CN | 105182346 A | | 12/2015 |
| CN | 105563493 A | | 5/2016 |
| CN | 106219439 A | * | 12/2016 |
| CN | 107765695 A | | 3/2018 |
| CN | 207189673 U | | 4/2018 |
| CN | 108196488 A | | 6/2018 |
| CN | 207699125 U | | 8/2018 |
| CN | 105548124 B | * | 2/2019 |
| CN | 209699082 U | | 11/2019 |
| CN | 111120827 A | | 5/2020 |
| EP | 1361190 A1 | | 11/2003 |
| EP | 3369698 A1 | | 9/2018 |
| WO | 2017109977 A1 | | 6/2017 |

OTHER PUBLICATIONS

The First Office Action dated Feb. 24, 2021 of Chinese Patent No. 201911310790.2.
Extended Search Report dated Oct. 5, 2023 of European Application No. 20901738.3.

* cited by examiner

CONTROL DEVICE OF LIFTING PLATFORM FOR DETECTION DEVICE AND DETECTION DEVICE

CROSS REFERENCE

The present disclosure claims priority to Chinese Patent Application No. 201911310790.2, filed on Dec. 18, 2019, entitled "CONTROL DEVICE OF LIFTING PLATFORM FOR DETECTION DEVICE AND DETECTION DEVICE", the entire contents of which are incorporated herein by reference in its entirety.

TECHNICAL FIELD

The present application relates to the field of electronics and information technology, and in particular, to a control device of a lifting platform of a detection device and a detection device.

BACKGROUND

With the continuous development of the information technology industry, most of the telecommunications and power departments of enterprises and governments set up computer rooms for storing servers. The computer rooms are usually placed with a plurality of cabinets, minicomputers and servers. The computer room is used to provide automated information technical service for employees or customers, which is an important part of the modern information technology industry.

At present, the computer room is equipped with a computer room inspection robot to monitor the devices in the computer room. The computer room inspection robot is equipped with a lifting platform. During the inspection, by raising the height of the lifting platform, the devices at a higher position are inspected.

SUMMARY

The embodiments of the present application provide a control device of a lifting platform of a detection device and a detection device.

The technical solution of the present application is realized as follows.

A control device of a lifting platform of a detection device is provided, for controlling the lifting platform of the detection device, wherein the control device includes:

a first distance measuring sensor, arranged at top of the detection device;

a first processor connected with the first distance measuring sensor, wherein the first processor is configured to obtain a first distance measurement instruction, and control the first distance measuring sensor to measure a first distance between the top of the detection device and an obstacle directly above the detection device according to the first distance measurement instruction;

wherein the first processor is further configured to obtain the first distance sent by the first distance measuring sensor, generate an elevation instruction according to the first distance, and control a lifting motor of the detection device to drive the lifting platform to rise to a target position from a current position according to the elevation instruction, such that the lifting platform does not collide with the obstacle.

Optionally, the control device further includes:
a second processor;
a Controller Area Network CAN transceiver;
wherein one end of the CAN transceiver is connected to the first processor through a CAN bus, and the other end of the CAN transceiver is connected to a first input end of the second processor;

an interface conversion circuit, wherein one end of the interface conversion circuit is connected to a first output end of the second processor, and the other end of the interface conversion circuit is connected to the first distance measuring sensor;

wherein the first processor is configured to obtain the first distance measurement instruction, and send the first distance measurement instruction to the CAN transceiver through the CAN bus;

the CAN transceiver is configured to send the first distance measurement instruction to the second processor after receiving the first distance measurement instruction;

the second processor is configured to convert the first distance measurement instruction according to a protocol conversion format, and send the converted first distance measurement instruction to the first distance measuring sensor through the interface conversion circuit;

the first distance measuring sensor is configured to measure the first distance according to the converted first distance measurement instruction.

Optionally, the first distance measuring sensor is configured to send the measured first distance to the second processor through the interface conversion circuit;

the second processor is configured to send the first distance to the CAN transceiver;

the CAN transceiver is configured to send the first distance to the first processor after receiving the first distance.

Optionally, the control device further includes:
a lifting motor drive circuit;
wherein one end of the lifting motor drive circuit is connected to the lifting motor, and the other end of the lifting motor drive circuit is connected to a second output end of the second processor;

wherein, the first processor is configured to send the elevation instruction to the second processor after generating the elevation instruction;

the second processor is configured to control the lifting motor to drive the lifting platform to rise to the target position according to the elevation instruction.

Optionally, the control device further includes:
a safety redundant control circuit, connected with a power supply module for supplying power for the lifting motor drive circuit;

wherein the safety redundant control circuit is configured to generate a power-off instruction when it is determined that a second distance between a top of the lifting platform and the obstacle is smaller than a target distance during a process of the lifting platform rising to the target position, and control the power supply module to stop supplying power for the lifting motor drive circuit according to the power-off instruction.

Optionally, the safety redundant control circuit includes:
a second distance measuring sensor, arranged at the top of the lifting platform;

wherein the second processor is further configured to obtain a second distance measurement instruction, and control the second distance measuring sensor to measure the second distance between the top of the lifting platform and the obstacle according to the second distance measurement instruction during the process of the lifting platform rising to the target position;

a comparator, wherein one end of the comparator is connected to the second distance measuring sensor, for comparing an analog voltage corresponding to the second distance with a reference voltage to obtain a comparison result; the reference voltage has an associated relationship with the target distance;

an amplifying circuit, wherein the amplifying circuit is connected to the other end of the comparator, and the amplifying circuit is configured to amplify the comparison result to obtain an amplification result; generate a power-off instruction when it is determined that the amplification result indicates that the second distance is smaller than the target distance, and control the power supply module to stop supplying power for the lifting motor drive circuit according to the power-off instruction.

Optionally, the safety redundant control circuit is connected to a second input end of the second processor;

the safety redundant control circuit is further configured to send the power-off instruction to the second processor after generating the power-off instruction;

the second processor is configured to send the power-off instruction to the CAN transceiver;

the CAN transceiver is configured to send the power-off instruction to the first processor after receiving the power-off instruction;

the first processor is configured to generate alarm information according to the power-off instruction, and output the alarm information.

Optionally, both the first distance measuring sensor and the second distance measuring sensor are ultrasonic sensors.

A detection device is provided, wherein the detection device includes the control device described above, the detection device further includes an image acquisition device, the image acquisition device is movably connected to the lifting platform, the image acquisition device is able to move in a first direction parallel to an axis of the lifting platform, and/or move in a second direction perpendicular to the first direction;

the detection device further includes a moving part for supporting the detection device to move on a bearing surface.

Optionally, the detection device further includes:
a first light-emitting part,
a second light-emitting part, wherein the second light-emitting part and the first light-emitting part are respectively disposed at two sides of the image acquisition device, and at least one of the second light-emitting part and the first light-emitting part is used for filling light during a process of capturing an image by the image acquisition device.

In the embodiment of the present application, according to the first distance measured by the first distance measuring sensor, i.e., the sensor disposed at the top of the control device, an elevation control instruction is generated to control the lifting platform to rise to the target position from the current position, so as to ensure that the lifting platform do not collide with the obstacle directly above the lifting platform.

Further, a safety redundant control circuit is also designed in the embodiment of the present application. In this way, even if the first distance measuring sensor fails to measure the height or other factors cause the lifting platform to rise unexpectedly, the safety redundant control circuit will cut off the power supply of the lifting platform, to prevent the lifting platform from colliding with the obstacle directly above the lifting platform.

A control device of a lifting platform of a detection device and a detection device are provided. The control device is used for controlling the lifting platform of the detection device and includes: a first distance measuring sensor, arranged at top of the detection device; a first processor connected with the first distance measuring sensor, wherein the first processor is configured to obtain a first distance measurement instruction, and control the first distance measuring sensor to measure a first distance between the top of the detection device and an obstacle directly above the detection device according to the first distance measurement instruction; wherein the first processor is further configured to obtain the first distance sent by the first distance measuring sensor, generate an elevation instruction according to the first distance, and control a lifting motor of the detection device to drive the lifting platform to rise to a target position from a current position according to the elevation instruction, such that the lifting platform does not collide with the obstacle. It solves the problem in the related art that when the map of the computer room changes or a hanging obstacle such as a lamp is newly added at the ceiling, the computer room inspection robot needs to re-calibrate the map, if the map is not re-calibrated timely, it is very likely that the lifting platform of the computer room inspection robot will hit the ceiling.

DETAILED DESCRIPTION

The technical solutions in the embodiments of the present application will be clearly and completely described below with reference to the accompanying drawings in the embodiments of the present application.

It is to be understood that "an embodiment of the present application" or "previous embodiment" mentioned throughout the specification means that a particular feature, structure or characteristic associated with the embodiment is included in at least one embodiment of the present application. Thus, "in an embodiment of the present application" or "in a previous embodiment" in various places throughout the specification not necessarily refers to the same embodiment. Furthermore, the particular features, structures or characteristics may be combined in any suitable manner in one or more embodiments. In various embodiments of the present application, the values of the sequence numbers of the above-mentioned processes do not mean the sequence of execution, and the execution sequence of each process should be determined by its functions and internal logic, rather than limiting the implementation process of the embodiments of the present application. The above-mentioned serial numbers of the embodiments of the present application are only for description, and do not represent the advantages or disadvantages of the embodiments.

Figure 1:
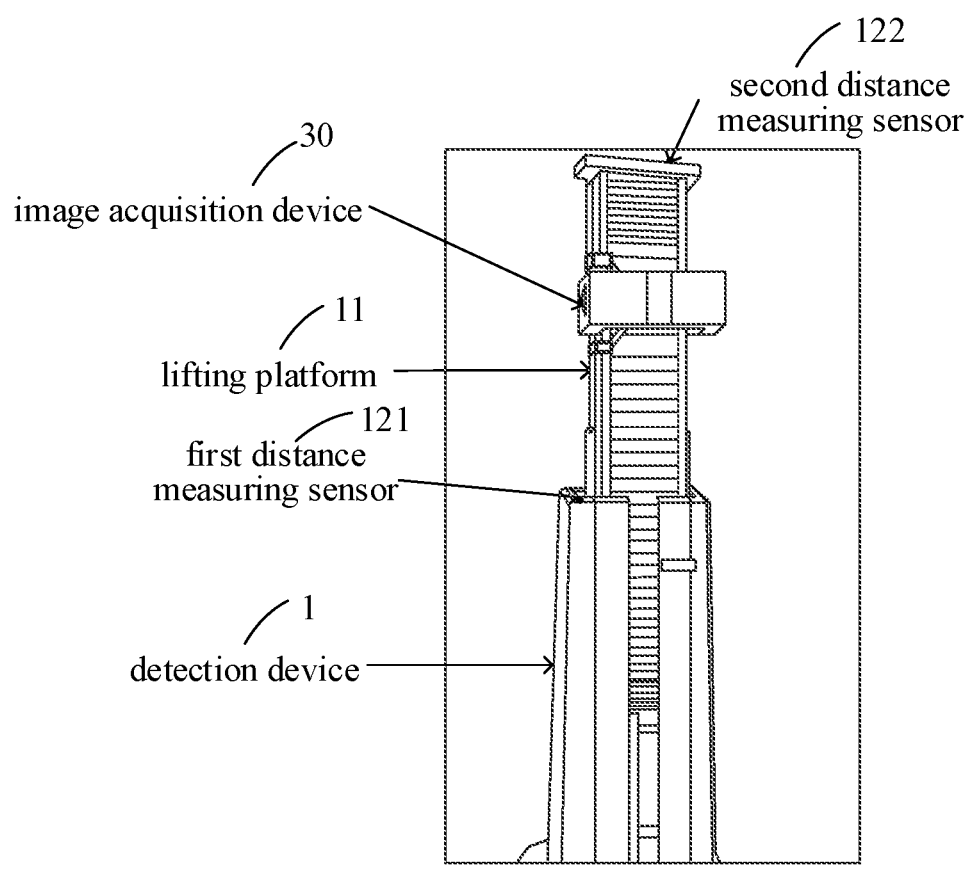
FIG. 1 is a schematic structural diagram of a detection device provided by an embodiment of the present application.
Figure 2:
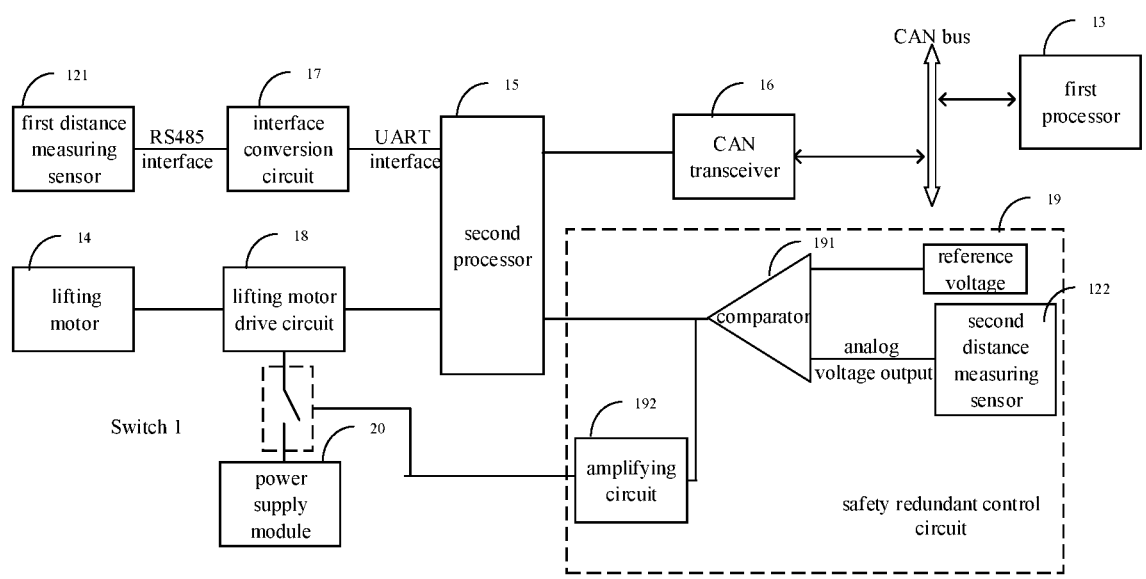
FIG. 2 is a schematic diagram of a circuit structure of a detection device provided by an embodiment of the present application.

The embodiment of the present application provides a control device of a lifting platform of a detection device, which is used to control the lifting platform of the detection device. The control device and the detection device can be physically co-located, or the control device and the detection device can be physically separated. For ease of understanding, for example, the control device and the detection device are physically co-located. As shown in FIG. 1 and FIG. 2, the control device (not shown in the figure) of the lifting platform 11 of the detection device 1 includes a first distance measuring sensor 121. The first distance measuring sensor 121 is arranged at the top of the detection device 1. For example, in FIG. 1, the first distance measuring sensor 121 is arranged at a position where the black dot is located at the top of the detection device 1.

A first processor 13 is connected with the first distance measuring sensor 121. The first processor 13 is configured to obtain a first distance measurement instruction, and control the first distance measuring sensor 121 to measure a first distance between the top of the detection device 1 and an obstacle (not shown in the figure) directly above the detection device 1 according to the first distance measurement instruction.

For example, the detection device is a computer room inspection robot, and the obstacles include the ceiling in the computer room where the computer room inspection robot is located, and hanging objects such as lamps and decorative objects set on the ceiling. Correspondingly, during the movement of the inspection robot, the inspection robot may, based on the first distance measurement instruction, control the first distance measuring sensor to measure the first distance between the top of the inspection robot and the obstacle directly above the inspection robot in real time. Here, the obstacle directly above the inspection robot is also the obstacle directly above the lifting platform. The lifting platform does not affect the detection of obstacles by the first distance measuring sensor set at the top of the inspection robot.

The first processor 13 is further configured to obtain the first distance sent by the first distance measuring sensor 121, generate an elevation instruction according to the first distance, and control a lifting motor 14 of the detection device 1 to drive the lifting platform 11 to rise to a target position from a current position according to the elevation instruction, such that the lifting platform 11 does not collide with the obstacle.

It should be noted that the lifting platform 11 can be used to carry the information acquisition device used in the detection process of the detection device 1, so as to ensure that the information acquisition device can reach a position with a suitable distance from the detected object in the case of not colliding with the obstacle. Herein, the information acquisition device includes, but not limited to, an image acquisition device and a temperature acquisition device.

The embodiments of the present application provide a control device of a lifting platform of a detection device, for controlling the lifting platform of the detection device, and the control device includes: a first distance measuring sensor, arranged at top of the detection device; a first processor connected with the first distance measuring sensor, wherein the first processor is configured to obtain a first distance measurement instruction, and control the first distance measuring sensor to measure a first distance between the top of the detection device and an obstacle directly above the detection device according to the first distance measurement instruction; wherein the first processor is further configured to obtain the first distance sent by the first distance measuring sensor, generate an elevation instruction according to the first distance, and control a lifting motor of the detection device to drive the lifting platform to rise to a target position from a current position according to the elevation instruction, such that the lifting platform does not collide with the obstacle. It solves the problem in the related art that when the map of the computer room changes or a hanging obstacle such as a lamp is newly added at the ceiling, the computer room inspection robot needs to re-calibrate the map, if the map is not re-calibrated timely, it is very likely that the lifting platform of the computer room inspection robot will hit the ceiling.

The computer room in the embodiment of the present application may be an Internet Data Center (IDC), and the construction height of the cabinet is usually between 2.2 meters and 2.6 meters. In the inspection process, the computer room inspection robot usually needs to rely on the lifting platform to inspect the servers at higher positions, in order to inspect all running servers.

During the construction of some computer rooms, ceilings at some positions are low or there are obstacles such as hanging lamps. In view of this situation, in the related art, a location with a low ceiling or a hanging lamp is usually marked on a map. When the inspection robot inspects these areas, the rising height of the lifting platform is lowered according to the marked position.

However, when the map changes or obstacles such as hanging lamps are newly added at the ceiling, the inspection robot needs to re-calibrate the map. If the calibration is not timely, the lifting platform may hit the ceiling, causing losses.

In one embodiment, when an intelligent inspection robot in a computer room performs test in computer rooms of some clients, it finds that there are hanging lamps on the ceiling in some areas of the computer room. The robot needs to identify the height to the obstacle on the ceiling when inspecting these areas. In the area having obstacles, the robot needs to adjust the height of the lifting platform to avoid collision. The control device provided in the embodiment of the present application can measure the height of the ceiling before the lifting platform is raised, and provide height parameters for the inspection robot, so as to prevent the lifting platform from hitting the ceiling or lamps. Moreover, the control device provided by the embodiment of the present application is also designed with safety redundancy. Even if the height measurement fails or other factors cause the lifting platform to rise unexpectedly, the safety redundant control circuit will cut off the power supply of the lifting platform to avoid collision.

In one embodiment, the control device further includes:
a second processor 15;
a Controller Area Network CAN transceiver 16;
wherein one end of the CAN transceiver is connected to the first processor 13 through a CAN bus, and the other end of the CAN transceiver 16 is connected to a first input end of the second processor;
an interface conversion circuit 17, wherein one end of the interface conversion circuit is connected to a first output end of the second processor, and the other end of the interface conversion circuit is connected to the first distance measuring sensor 121;
wherein the first processor 13 is configured to obtain the first distance measurement instruction, and send the first distance measurement instruction to the CAN transceiver 16 through the CAN bus;
the CAN transceiver 16 is configured to send the first distance measurement instruction to the second processor 15 after receiving the first distance measurement instruction;
the second processor 15 is configured to convert the first distance measurement instruction according to a protocol conversion format, and send the converted first distance measurement instruction to the first distance measuring sensor 121 through the interface conversion circuit 17;

the first distance measuring sensor 121 is configured to measure the first distance according to the converted first distance measurement instruction.

In an embodiment, the first distance measuring sensor 121 is configured to send the measured first distance to the second processor 15 through the interface conversion circuit 17;

the second processor 15 is configured to send the first distance to the CAN transceiver 16;

the CAN transceiver 16 is configured to send the first distance to the first processor 13 after receiving the first distance.

In one embodiment, the control device further includes:

a lifting motor drive circuit 18;

wherein one end of the lifting motor drive circuit is connected to the lifting motor 14, and the other end of the lifting motor drive circuit is connected to a second output end of the second processor;

wherein, the first processor 13 is configured to send the elevation instruction to the second processor 15 after generating the elevation instruction;

the second processor 15 is configured to control the lifting motor 14 to drive the lifting platform 11 to rise to the target position according to the elevation instruction.

In one embodiment, the control device further includes:

a safety redundant control circuit 19, connected with a power supply module 20 for supplying power for the lifting motor drive circuit 18;

wherein the safety redundant control circuit 19 is configured to generate a power-off instruction when it is determined that a second distance between a top of the lifting platform and the obstacle is smaller than a target distance during a process of the lifting platform 11 rising to the target position, and control the power supply module 20 to stop supplying power for the lifting motor drive circuit 18 according to the power-off instruction.

In one embodiment, the safety redundant control circuit 19 includes:

a second distance measuring sensor 122, arranged at the top of the lifting platform 11;

wherein the second processor 15 is further configured to obtain a second distance measurement instruction, and control the second distance measuring sensor 122 to measure the second distance between the top of the lifting platform and the obstacle according to the second distance measurement instruction during the process of the lifting platform 11 rising to the target position;

a comparator 191, wherein one end of the comparator is connected to the second distance measuring sensor, for comparing an analog voltage corresponding to the second distance with a reference voltage to obtain a comparison result; the reference voltage has an associated relationship with the target distance;

an amplifying circuit 192, wherein the amplifying circuit 192 is connected to the other end of the comparator, and the amplifying circuit 192 is configured to amplify the comparison result to obtain an amplification result; generate a power-off instruction when it is determined that the amplification result indicates that the second distance is smaller than the target distance, and control the power supply module 20 to stop supplying power for the lifting motor drive circuit 18 according to the power-off instruction.

In one embodiment, the safety redundant control circuit 19 is connected to a second input end of the second processor;

the safety redundant control circuit 19 is further configured to send the power-off instruction to the second processor 15 after generating the power-off instruction;

the second processor 15 is configured to send the power-off instruction to the CAN transceiver 16;

the CAN transceiver 16 is configured to send the power-off instruction to the first processor 13 after receiving the power-off instruction;

the first processor 13 is configured to generate alarm information according to the power-off instruction, and output the alarm information.

In this embodiment of the present application, the first processor may be a central processor shared by the control device and the detection device, serving as an operation and control core. The functions of the second processor include protocol conversion for instructions to ensure data intercommunication between different modules.

In the control device provided by the embodiment of the present application, the control device and the Jingdong intelligent computer room inspection robot are physically co-located. The inspection robot is controlled by the first processor, i.e., the main processor, and the internal devices of the inspection robot are mounted on the CAN bus, and communicate through the CAN bus. When the inspection robot is inspecting, the first distance measuring sensor measures the height of the ceiling, and sends the measured information to the main processor. The main processor sends instructions to the second processor, such as a single-chip microcomputer, to control the lifting height of the lifting platform. The second distance measuring sensor is located above the lifting platform and uses an analog output voltage. When the distance between the first distance measuring sensor and the obstacle is less than the target distance, such as 10 cm, the voltage output by the first distance measuring sensor exceeds the reference voltage of the comparator. The output voltage of the comparator is inverted, one way of signals is output to the second processor, and one way of signals is output to the amplifier circuit to amplify the signal. The signal output by the amplifier circuit cuts off the power switch switch1 of the lifting motor drive circuit, and stops supplying power for the lifting motor drive circuit. The lifting motor stops moving after being powered off.

In some embodiments of the present application, the inspection process of the inspection robot is described as follows. In the first step, the first distance measuring sensor of the inspection robot, such as the ultrasonic sensor A, is the 485 communication interface, the distance information is output through 485. The ultrasonic sensor A is located at the top of the inspection robot. The second distance measuring sensor, such as the ultrasonic sensor B, is an analog voltage output, and the distance information is reflected by voltage changes. The ultrasonic sensor B is located at the top of the lifting platform. The lifting platform is driven by the lifting motor and can move up and down.

In the second step, the inspection robot is controlled by the main processor. When the inspection robot starts inspection, the main processor issues distance measurement instructions through the CAN bus. The CAN transceiver converts the differential signal into a Transistor-Transistor logic (TTL) level. The single-chip microcomputer performs protocol conversion after receiving the distance measurement instruction, and sends the distance measurement instruction of the ultrasonic sensor A through the Universal Asynchronous Receiver/Transmitter (UART), through the UART to the 485 circuit, the ultrasonic sensor A receives the distance measurement instruction to measure the distance. The ultrasonic sensor A sends the measured distance information to the UART interface of the single-chip microcomputer. The single-chip microcomputer sends it to the main processor through the CAN bus. The main controller sends the lifting instruction to the single-chip microcomputer according to the measured ceiling height. In the third step, after receiving the lifting instruction, the single-chip microcomputer of the inspection robot controls the lifting motor drive circuit to drive the lifting motor to rise to the designated position.

In the fourth step, when the ultrasonic sensor A of the inspection robot fails to measure the distance or the main processor issues an incorrect lifting instruction, the safety redundant control circuit of the inspection robot cuts off the power supply for supplying power for the driving circuit of the lifting motor, to ensure that the lifting platform will not collide with the ceiling. In some cases, the instruction of the main controller is wrong or the ultrasonic sensor A fails to measure the distance, when the lifting platform gradually rises, the analog voltage value output by the ultrasonic sensor B gradually increases, when the distance between the lifting platform and the ceiling reaches the threshold value 10 cm, the output voltage of the ultrasonic wave B exceeds the comparator reference voltage, the output level of the comparator is inverted, and the inverted voltage is output to the single-chip microcomputer. The single-chip microcomputer transmits the alarm information to the main processor. At the same time, the output of the comparator is amplified by the amplifier circuit and then input to the switch switch1, switch1 are disconnected. The power supply of the lifting motor drive circuit is stopped, and the lifting platform stops moving, which prevents the lifting platform from colliding with the ceiling.

In the fifth step, the inspection robot enters the next inspection task, and repeats the second step to the fourth step.

It can be seen from the above that the control device of the lifting platform of the detection device provided in the embodiment of the present application generates an elevation control instruction according to the first distance measured by the first distance measuring sensor, i.e., the sensor arranged at the top of the control device, and controls the lifting platform to rise to the target position from the current position, to ensure that the lifting platform do not collide with the obstacle directly above the lifting platform. Further, a safety redundant control circuit is also designed in the embodiment of the present application. In this way, even if the first distance measuring sensor fails to measure the height or other factors cause the lifting platform to rise unexpectedly, the safety redundant control circuit will cut off the power supply of the lifting platform, to prevent the lifting platform from colliding with the obstacle directly above the lifting platform.

Figure 3:
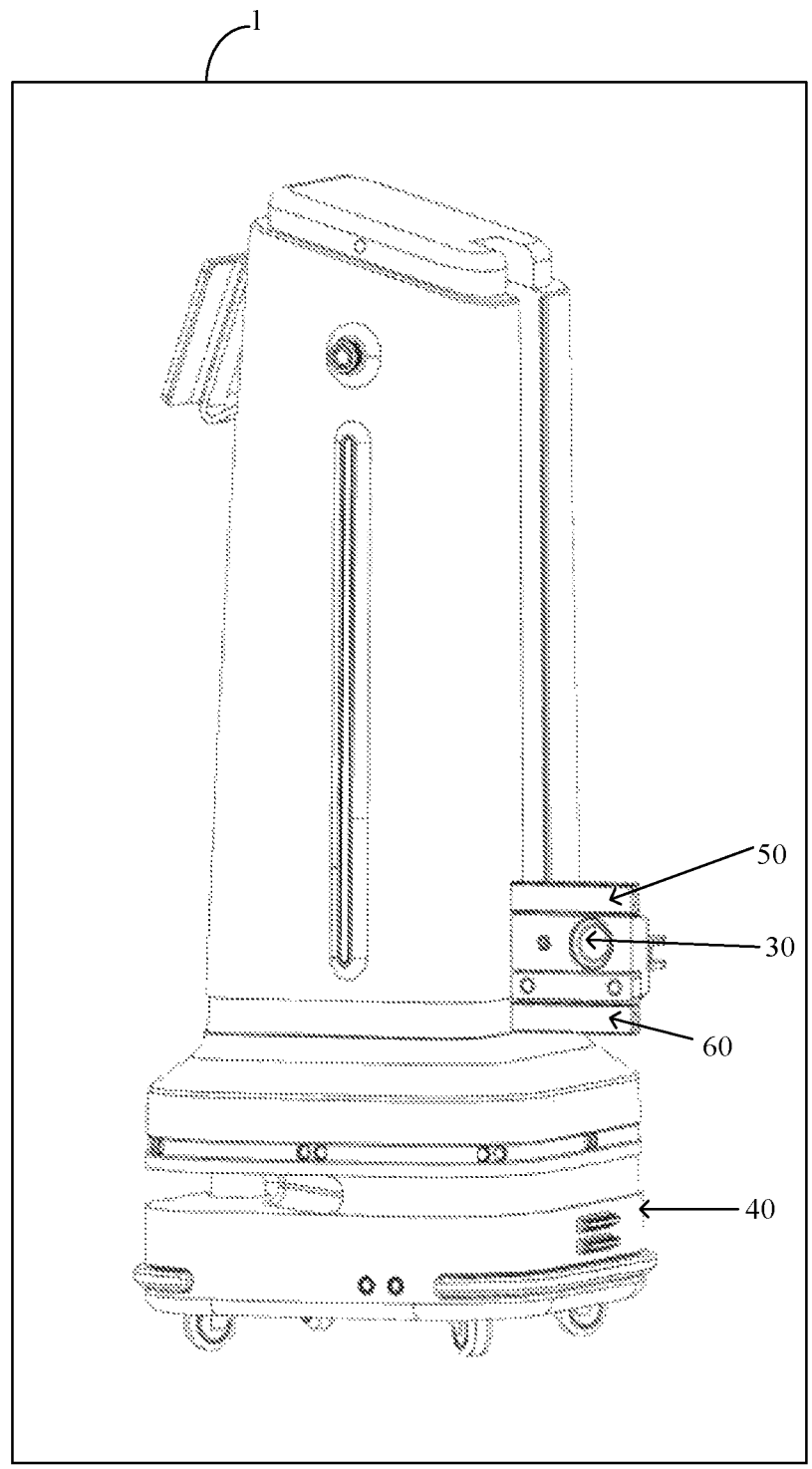
FIG. 3 is a schematic structural diagram of another detection device provided by an embodiment of the present application.

In other embodiments of the present application, as shown in FIG. 3 and FIG. 1, the detection device 1 includes not only the above-mentioned control device, but also an image acquisition device 30. The image acquisition device 30 is movably connected to the lifting platform 11. The image acquisition device 30 may move in a first direction parallel to an axis of the lifting platform, and/or move in a second direction perpendicular to the first direction.

Here, the image acquisition device 30 includes at least one of an industrial camera, a thermal infrared camera, and a surveillance camera. The industrial camera is used to photograph the target object to obtain the characteristic information of the target object. The thermal infrared camera is used to photograph the target object to obtain the thermal distribution information of the target object. The surveillance camera is used to collect video information in real time. In addition, the image acquisition device 30 is movably connected to the lifting platform 11, so that the image capturing operation of the image acquisition device 30 is more flexible.

In other embodiments of the present application, the detection device 1 further includes a moving part 40 for supporting the detection device 1 to move on a bearing surface.

Here, the moving part 40 has a moving pulley. The detection device 1 may move on the bearing surface through the rolling of the moving pulley on the bearing surface. The bearing surface can be ground or other surfaces, and the bearing surface can be a horizontal plane or an inclined plane. The moving pulley can be arranged at the side of the chassis of the detection device 1 that is close to the bearing surface. The structure for supporting the movement of the moving part 40 is not specifically limited in the embodiment of the present application.

In an embodiment, the first processor 13 may receive a movement instruction sent to it by an external device, and control the moving part 40 to move accordingly based on the movement instruction. In another implementation, the first processor 13 may call a movement program stored in the first processor 13, and control the moving part 40 to move accordingly based on the movement program. For example, when the detection device 1 is an inspection robot, and the application scenario is to capture images of a plurality of devices in the computer room, the moving part 40 can automatically pass through each device in sequence under the control of the first processor 13, and capture images of each device.

In other embodiments of the present application, the detection device 1 further includes:

a first light-emitting part 50 and a second light-emitting part 60, wherein the second light-emitting part 60 and the first light-emitting part 50 are respectively disposed at two sides of the image acquisition device 30, and at least one of the second light-emitting part 60 and the first light-emitting part 50 is used for filling light during a process of capturing an image by the image acquisition device 30, to support the image acquisition device 30 to capture high-quality images or videos, and to ensure that the image acquisition device 30 can still obtain clear device images in a dark environment.

Here, the first light-emitting component 50 and the second light-emitting component 60 can simultaneously fill light during the image acquisition process by the image acquisition device 30, or only one of them can fill light, which can be flexibly selected according to the current ambient light parameters where the detection device is located.

It should be noted that the above-mentioned controller may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, and a microprocessor. It can be understood that the electronic device that implements the above processor function may also be others, which is not specifically limited in the embodiment of the present application.

In several embodiments provided in this application, it should be understood that the disclosed devices and methods may be implemented in other manners. The device embodiments described above are only illustrative. For example, the division of the units is only a logical function division. In actual implementation, there may be other division manners. For example, a plurality of units or components may be combined, or may be integrated into another system, or some features can be ignored, or not implemented. In addition, the coupling, or direct coupling, or communication connection between various components shown or discussed may be through some interfaces, and the indirect coupling or communication connection of devices or units may be electrical, mechanical or other forms.

The units described above as separate components may or may not be physically separated, and the components displayed as units may or may not be physical units, that is, they may be located in one place or distributed over a plurality of network units. Some or all of the units may be selected according to actual needs to achieve the purpose of the solution in this embodiment.

In addition, each functional unit in each embodiment of the present application may all be integrated into one processing module, or each unit may be separately used as a unit, or two or more units may be integrated into one unit. The above integrated unit can be implemented either in the form of hardware or in the form of hardware in combination with software functional units. Those of ordinary skill in the art can understand that all or part of the steps of implementing the above method embodiments may be completed by the program to instruct related hardware. The aforementioned program may be stored in a computer-readable storage medium. When the program is executed, the steps including the above method embodiments are executed. The aforementioned storage medium includes: a mobile storage device, a Read-Only Memory (ROM), a Random Access Memory (RAM), a magnetic disk or an optical disk and other various media that can store program codes.

The features disclosed in several product embodiments provided in this application can be combined arbitrarily without conflict, to obtain new product embodiments.

The features disclosed in several method or device embodiments provided in this application may be combined arbitrarily without conflict, to obtain new method embodiments or device embodiments.

The above are only specific embodiments of the present application, but the protection scope of the present application is not limited to this. Any person skilled in the art can easily think of changes or substitutions within the technical scope disclosed in the present application, which should be covered within the protection scope of the present application. Therefore, the protection scope of the present application shall be subject to the protection scope of the claims.

What is claimed is:

1. A control device of a lifting platform of a detection device, for controlling the lifting platform of the detection device, wherein the control device comprises:
 a first distance measuring sensor, arranged at top of the detection device;
 a first processor connected with the first distance measuring sensor, wherein the first processor is configured to obtain a first distance measurement instruction, and control the first distance measuring sensor to measure a first distance between the top of the detection device and an obstacle directly above the detection device according to the first distance measurement instruction;
 wherein the first processor is further configured to obtain the first distance sent by the first distance measuring sensor, generate an elevation instruction according to the first distance, and control a lifting motor of the detection device to drive the lifting platform to rise to a target position from a current position according to the elevation instruction, such that the lifting platform does not collide with the obstacle,
wherein the control device further comprises:
 a lifting motor drive circuit, wherein one end of the lifting motor drive circuit is connected to the lifting motor;
 a safety redundant control circuit, connected with a power supply module for supplying power for the lifting motor drive circuit,
 wherein the safety redundant control circuit is configured to generate a power-off instruction when it is determined that a second distance between a top of the lifting platform and the obstacle is smaller than a target distance during a process of the lifting platform rising to the target position, and control the power supply module to stop supplying power for the lifting motor drive circuit according to the power-off instruction.

2. The control device of the lifting platform of the detection device according to claim 1, further comprising:
 a second processor;
 a Controller Area Network CAN transceiver;
 wherein one end of the CAN transceiver is connected to the first processor through a CAN bus, and the other end of the CAN transceiver is connected to a first input end of the second processor;
 an interface conversion circuit, wherein one end of the interface conversion circuit is connected to a first output end of the second processor, and the other end of the interface conversion circuit is connected to the first distance measuring sensor;
 wherein the first processor is configured to obtain the first distance measurement instruction, and send the first distance measurement instruction to the CAN transceiver through the CAN bus;
 the CAN transceiver is configured to send the first distance measurement instruction to the second processor after receiving the first distance measurement instruction;
 the second processor is configured to convert the first distance measurement instruction according to a protocol conversion format, and send the converted first distance measurement instruction to the first distance measuring sensor through the interface conversion circuit;
 the first distance measuring sensor is configured to measure the first distance according to the converted first distance measurement instruction.

3. The control device of the lifting platform of the detection device according to claim 2, wherein
 the first distance measuring sensor is configured to send the measured first distance to the second processor through the interface conversion circuit;
 the second processor is configured to send the first distance to the CAN transceiver;
 the CAN transceiver is configured to send the first distance to the first processor after receiving the first distance.

4. The control device of the lifting platform of the detection device according to claim 2,
 wherein the other end of the lifting motor drive circuit is connected to a second output end of the second processor;
 wherein, the first processor is configured to send the elevation instruction to the second processor after generating the elevation instruction;
 the second processor is configured to control the lifting motor to drive the lifting platform to rise to the target position according to the elevation instruction.

5. The control device of the lifting platform of the detection device according to claim 1, wherein the safety redundant control circuit comprises:
a second distance measuring sensor, arranged at the top of the lifting platform;
wherein the second processor is further configured to obtain a second distance measurement instruction, and control the second distance measuring sensor to measure the second distance between the top of the lifting platform and the obstacle according to the second distance measurement instruction during the process of the lifting platform rising to the target position;
a comparator, wherein one end of the comparator is connected to the second distance measuring sensor, for comparing an analog voltage corresponding to the second distance with a reference voltage to obtain a comparison result; the reference voltage has an associated relationship with the target distance;
an amplifying circuit, wherein the amplifying circuit is connected to the other end of the comparator, and the amplifying circuit is configured to amplify the comparison result to obtain an amplification result; generate a power-off instruction when it is determined that the amplification result indicates that the second distance is smaller than the target distance, and control the power supply module to stop supplying power for the lifting motor drive circuit according to the power-off instruction.

6. The control device of the lifting platform of the detection device according to claim 1, wherein
the safety redundant control circuit is connected to a second input end of the second processor;
the safety redundant control circuit is further configured to send the power-off instruction to the second processor after generating the power-off instruction;
the second processor is configured to send the power-off instruction to the CAN transceiver;
the CAN transceiver is configured to send the power-off instruction to the first processor after receiving the power-off instruction;
the first processor is configured to generate alarm information according to the power-off instruction, and output the alarm information.

7. The control device of the lifting platform of the detection device according to claim 5, wherein
both the first distance measuring sensor and the second distance measuring sensor are ultrasonic sensors.

8. A detection device, wherein the detection device comprises a control device of a lifting platform of the detection device, for controlling the lifting platform of the detection device, wherein the control device comprises: a first distance measuring sensor, arranged at top of the detection device; a first processor connected with the first distance measuring sensor, wherein the first processor is configured to obtain a first distance measurement instruction, and control the first distance measuring sensor to measure a first distance between the top of the detection device and an obstacle directly above the detection device according to the first distance measurement instruction; wherein the first processor is further configured to obtain the first distance sent by the first distance measuring sensor, generate an elevation instruction according to the first distance, and control a lifting motor of the detection device to drive the lifting platform to rise to a target position from a current position according to the elevation instruction, such that the lifting platform does not collide with the obstacle, the detection device further comprises an image acquisition device, the image acquisition device is movably connected to the lifting platform, the image acquisition device is able to move in a first direction parallel to an axis of the lifting platform, and/or move in a second direction perpendicular to the first direction;
the detection device further comprises a moving part for supporting the detection device to move on a bearing surfacer
wherein the control device further comprises:
a first light-emitting part,
a second light-emitting part, wherein the second light-emitting part and the first light-emitting part are respectively disposed at two sides of the image acquisition device, and at least one of the second light-emitting part and the first light-emitting part is used for filling light during a process of capturing an image by the image acquisition device.

9. The control device of the lifting platform of the detection device according to claim 3,
wherein the other end of the lifting motor drive circuit is connected to a second output end of the second processor;
wherein, the first processor is configured to send the elevation instruction to the second processor after generating the elevation instruction;
the second processor is configured to control the lifting motor to drive the lifting platform to rise to the target position according to the elevation instruction.

10. The control device of the lifting platform of the detection device according to claim 5, wherein
the safety redundant control circuit is connected to a second input end of the second processor;
the safety redundant control circuit is further configured to send the power-off instruction to the second processor after generating the power-off instruction;
the second processor is configured to send the power-off instruction to the CAN transceiver;
the CAN transceiver is configured to send the power-off instruction to the first processor after receiving the power-off instruction;
the first processor is configured to generate alarm information according to the power-off instruction, and output the alarm information.

11. The control device of the lifting platform of the detection device according to claim 6, wherein
both the first distance measuring sensor and the second distance measuring sensor are ultrasonic sensors.

12. A detection device, wherein the detection device comprises a control device of a lifting platform of the detection device, for controlling the lifting platform of the detection device, wherein the control device comprises: a first distance measuring sensor, arranged at top of the detection device; a first processor connected with the first distance measuring sensor, wherein the first processor is configured to obtain a first distance measurement instruction, and control the first distance measuring sensor to measure a first distance between the top of the detection device and an obstacle directly above the detection device according to the first distance measurement instruction; wherein the first processor is further configured to obtain the first distance sent by the first distance measuring sensor, generate an elevation instruction according to the first distance, and control a lifting motor of the detection device to drive the lifting platform to rise to a target position from a current position according to the elevation instruction, such that the lifting platform does not collide with the obstacle, the detection device further comprises an image acquisition device, the image acquisition device is movably connected to the lifting platform, the image acquisition device is able to move in a first direction parallel to an axis of the lifting platform, and/or move in a second direction perpendicular to the first direction;

the detection device further comprises a moving part for supporting the detection device to move on a bearing surface, wherein the control further comprises:

a second processor;

a Controller Area Network CAN transceiver;

wherein one end of the CAN transceiver is connected to the first processor through a CAN bus, and the other end of the CAN transceiver is connected to a first input end of the second processor;

an interface conversion circuit, wherein one end of the interface conversion circuit is connected to a first output end of the second processor, and the other end of the interface conversion circuit is connected to the first distance measuring sensor;

wherein the first processor is configured to obtain the first distance measurement instruction, and send the first distance measurement instruction to the CAN transceiver through the CAN bus;

the CAN transceiver is configured to send the first distance measurement instruction to the second processor after receiving the first distance measurement instruction;

the second processor is configured to convert the first distance measurement instruction according to a protocol conversion format, and send the converted first distance measurement instruction to the first distance measuring sensor through the interface conversion circuit;

the first distance measuring sensor is configured to measure the first distance according to the converted first distance measurement instruction, wherein the control device further comprises: a lifting motor drive circuit, wherein one end of the lifting motor drive circuit is connected to the lifting motor, and the other end of the lifting motor drive circuit is connected to a second output end of the second processor;

wherein, the first processor is configured to send the elevation instruction to the second processor after generating the elevation instruction;

the second processor is configured to control the lifting motor to drive the lifting platform to rise to the target position according to the elevation instruction, wherein the control device further comprises: a safety redundant control circuit, connected with a power supply module for supplying power for the lifting motor drive circuit;

wherein the safety redundant control circuit is configured to generate a power-off instruction when it is determined that a second distance between a top of the lifting platform and the obstacle is smaller than a target distance during a process of the lifting platform rising to the target position, and control the power supply module to stop supplying power for the lifting motor drive circuit according to the power-off instruction.

13. The detection device according to claim 12, wherein the safety redundant control circuit comprises:

a second distance measuring sensor, arranged at the top of the lifting platform;

wherein the second processor is further configured to obtain a second distance measurement instruction, and control the second distance measuring sensor to measure the second distance between the top of the lifting platform and the obstacle according to the second distance measurement instruction during the process of the lifting platform rising to the target position;

a comparator, wherein one end of the comparator is connected to the second distance measuring sensor, for comparing an analog voltage corresponding to the second distance with a reference voltage to obtain a comparison result; the reference voltage has an associated relationship with the target distance;

an amplifying circuit, wherein the amplifying circuit is connected to the other end of the comparator, and the amplifying circuit is configured to amplify the comparison result to obtain an amplification result; generate a power-off instruction when it is determined that the amplification result indicates that the second distance is smaller than the target distance, and control the power supply module to stop supplying power for the lifting motor drive circuit according to the power-off instruction.

14. The detection device according to claim 12, wherein the safety redundant control circuit is connected to a second input end of the second processor;

the safety redundant control circuit is further configured to send the power-off instruction to the second processor after generating the power-off instruction;

the second processor is configured to send the power-off instruction to the CAN transceiver;

the CAN transceiver is configured to send the power-off instruction to the first processor after receiving the power-off instruction;

the first processor is configured to generate alarm information according to the power-off instruction, and output the alarm information.

15. The detection device according to claim 13, wherein both the first distance measuring sensor and the second distance measuring sensor are ultrasonic sensors.

* * * * *